United States Patent

Suyama et al.

(10) Patent No.: US 8,621,643 B2
(45) Date of Patent: Dec. 31, 2013

(54) SEMICONDUCTOR DEVICE

(75) Inventors: Hiroko Suyama, Yokohama (JP);
Kenichiro Shibata, Yokohama (JP);
Hiroki Wakamatsu, Yokohama (JP)

(73) Assignee: Spansion LLC, Sunnyvale, CA (US)

(*) Notice: Subject to any disclaimer, the term of this patent is extended or adjusted under 35 U.S.C. 154(b) by 31 days.

(21) Appl. No.: 13/316,517

(22) Filed: Dec. 11, 2011

(65) Prior Publication Data

US 2012/0192282 A1    Jul. 26, 2012

(30) Foreign Application Priority Data

Jan. 21, 2011  (JP) .................................. 2011-011243

(51) Int. Cl.
*G06F 21/00*  (2013.01)

(52) U.S. Cl.
USPC .......................................................... 726/26

(58) Field of Classification Search
USPC ................................ 726/26–30; 714/724, 726
See application file for complete search history.

(56) References Cited

U.S. PATENT DOCUMENTS

| | | | |
|---|---|---|---|
| 5,734,819 A * | 3/1998 | Lewis | 726/29 |
| 5,826,007 A | 10/1998 | Sakaki et al. | |
| 6,088,262 A * | 7/2000 | Nasu | 365/185.04 |
| 6,885,607 B2 | 4/2005 | Ozawa | |
| 6,898,125 B2 | 5/2005 | Tanaka | |
| 7,594,087 B2 * | 9/2009 | Zeevi et al. | 711/165 |

FOREIGN PATENT DOCUMENTS

| | | |
|---|---|---|
| JP | H7-271751 A | 10/1995 |
| JP | H9-198316 | 7/1997 |
| JP | H10-301855 A | 11/1998 |
| JP | 2003-263368 A | 9/2003 |
| JP | 2004-227509 A | 8/2004 |
| JP | 2004-288257 A | 10/2004 |

\* cited by examiner

*Primary Examiner* — Brandon Hoffman
*Assistant Examiner* — Anthony Brown
(74) *Attorney, Agent, or Firm* — Sterne, Kessler, Goldstein & Fox, P.L.L.C.

(57) ABSTRACT

A semiconductor device includes a nonvolatile memory, and an interface configured to transfer data to and from the nonvolatile memory. The interface includes a security logic unit which controls a security level for the data written to the nonvolatile memory, in accordance with a plurality of preset security codes and a lock code that is written to a specific area in the nonvolatile memory.

19 Claims, 19 Drawing Sheets

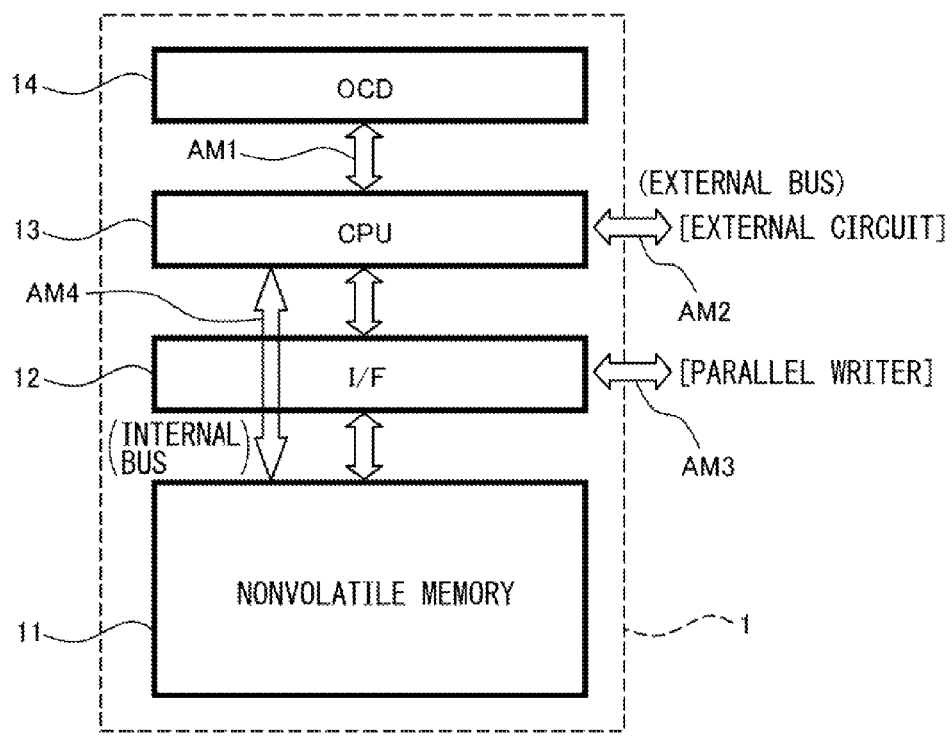

FIG.3

| MODE | NAME | STORAGE LOCATION |
|---|---|---|
| TEST MODE | TEST SECURITY CODE | I/F |
| NORMAL MODE | USER SECURITY CODE | I/F |

FIG.4

| | SECURITY CODE AND LOCK CODE | |
|---|---|---|
| | MATCH | DO NOT MATCH |
| TEST MODE | SECURITY:ON | SECURITY:OFF |
| NORMAL MODE | SECURITY:OFF | SECURITY:ON |

| NAME | | VALUE EXAMPLES (16-bit MICROCONTROLLER) |
|---|---|---|
| SECURITY CODE A | TEST SECURITY CODE (INITIAL ANALYSIS SECURITY CODE) | 0x1234h |
| SECURITY CODE B | | 0x5678h |
| SECURITY CODE C | USER SECURITY CODE | 0xFFFFh,0xAA55h |

FIG.18

| | VALUE | SECURITY CODE/INITIAL ANALYSIS EFFECT |
|---|---|---|
| a | x1234h | · SECURITY UNABLE TO BE UNLOCKED EVEN WHEN SWITCHED TO TEST MODE<br>· HIGHEST SECURITY LEVEL<br>· ANALYSIS OF INITIAL STATE NOT POSSIBLE WHEN PRODUCT IS RETURNED DUE TO FAULT |
| b | x5678h | · BASICALLY SECURITY UNABLE TO BE UNLOCKED EVEN WHEN SWITCHED TO TEST MODE<br>· WHEN PRODUCT IS RETURNED DUE TO FAULT, INITIAL STATE (SECTOR Vt DISTRIBUTION, ETC.) CAN BE ACQUIRED WITHOUT NEED FOR CHIP ERASE |
| c | 0xFFFFh, 0xAA55h OR OTHER THAN 0x1234h OR 0x5678h | · SECURITY UNLOCKED WHEN SWITCHED TO TEST MODE<br>· LOWEST SECURITY LEVEL<br>· WHEN PRODUCT IS RETURNED DUE TO FAULT, INITIAL ANALYSIS CAN BE PERFORMED THOROUGHLY WITHOUT NEED FOR CHIP ERASE |

LOCK CODE
{CODE SUPPLIED TO USER FOR WRITING TO LOCK CODE STORAGE AREA}

FIG.19

| | LOCK CODE | NORMAL MODE | | | TEST MODE | | |
|---|---|---|---|---|---|---|---|
| | | CHIP ERASE COMMAND | COMMAND DESIRED TO BE USED FOR INITIAL ANALYSIS | OTHER COMMANDS | CHIP ERASE COMMAND | COMMAND DESIRED TO BE USED FOR INITIAL ANALYSIS | OTHER COMMANDS |
| a | 0x1234h | ○ | × | × | ○ | × | × |
| b | 0x5678h | ○ | × | × | ○ | ○ | × |
| – | xFFFFh, xAA55h | ○ | ○ | ○ | ○ | ○ | ○ |
| c | OTHER THAN ABOVE | ○ | × | × | ○ | ○ | ○ |

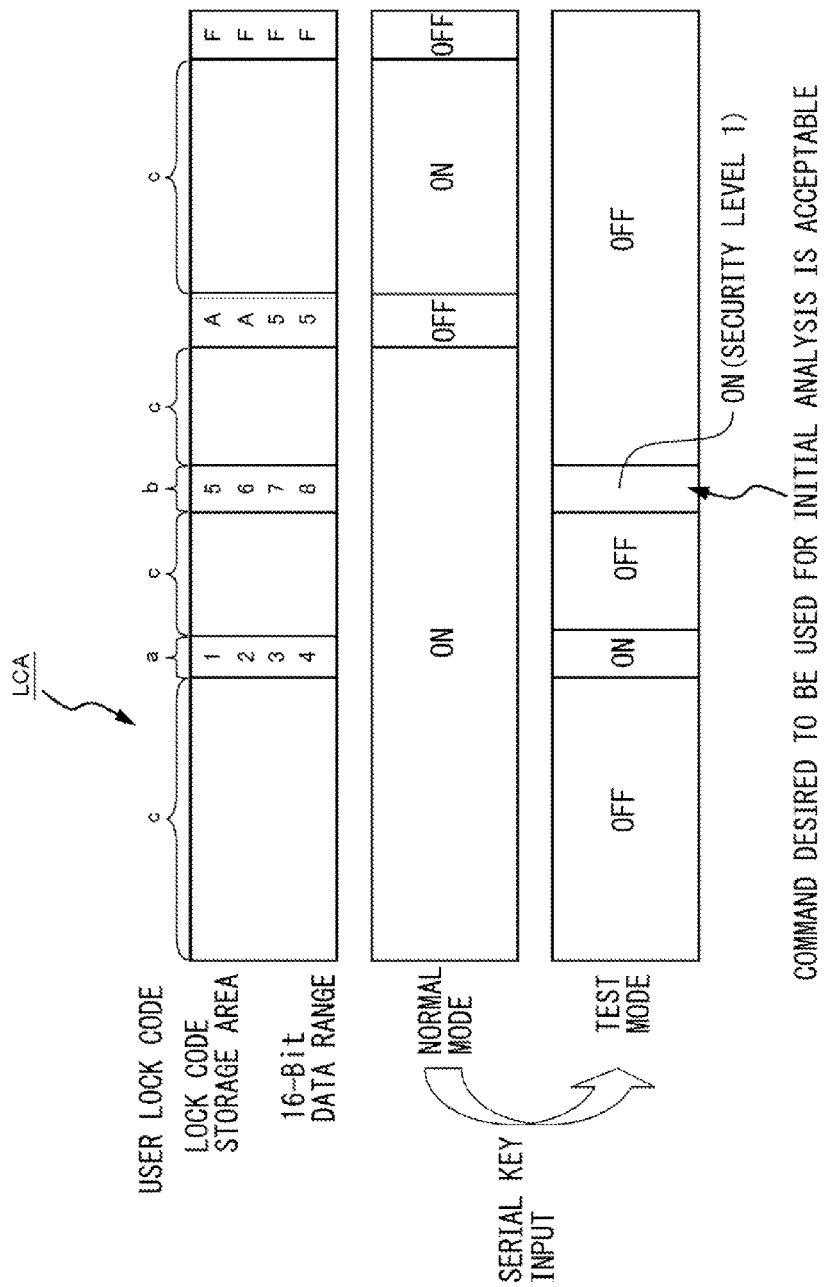

FIG. 21A

| STEP | TIME SERIES | NONVOLATILE MEMORY I/F | | | NONVOLATILE MEMORY | VALUE WRITTEN TO LCA (LOCK CODE) | MODE | SECURITY | COMMENTS |
|---|---|---|---|---|---|---|---|---|---|
| | | SECURITY CODES | | | STATE OF LOCK CODE STORAGE AREA (LCA) | | | | |
| | | SECURITY CODE A | SECURITY CODE B | SECURITY CODE C | | | | | |
| P1 | DESIGN STAGE | 0x1234h | 0x5678h | 0xFFFFh 0xAA55h | SAME AS OTHER MEMORY AREA | — | — | — | CONSIDER FOLLOWING WHEN DETERMINING SECURITY CODES. SECURITY CODES A,B: SET TO VALUE FAR FROM VALUE USED IN TEST AS WELL AS MEMORY CELL DATA VALUE RESULTING FROM PROCESS OUT. SECURITY CODE C: CAN BE SET TO ANY VALUE USED IN TEST PERFORMED USING NORMAL MODE. SET TO SAME VALUE (xFFFFh) AS VALUE RESULTING FROM CHIP ERASE. |
| P2 | PROCESS OUT | 0x1234h | 0x5678h | 0xFFFFh 0xAA55h | CLOSE TO xFFFFh BUT INDETERMINATE | — | — | — | SINCE POSSIBILITY OF MATCHING IS VERY SMALL, THERE IS LITTLE CHANCE OF SECURITY BEING SET ON |
| P3 | PROBE TEST | 0x1234h | 0x5678h | 0xFFFFh 0xAA55h | PROBE TEST PATTERN IS WRITTEN | — | TEST MODE | OFF | SECURITY WILL NOT BE SET ON IF SAME VALUE AS SECURITY CODE A (0x1234h) IS NOT USED AS PROBE TEST PATTERN |
| P4 | FT TEST | 0x1234h | 0x5678h | 0xFFFFh 0xAA55h | FT TEST PATTERN IS WRITTEN (FOR EXAMPLE, xFFFFh WHEN ERASED TO xAA55h) | — | TEST MODE/ NORMAL MODE | OFF | IF SECURITY CODE C IS SET TO VALUE CORRESPONDING TO PATTERN USED IN TEST AND IF SECURITY CODES A,B ARE SET TO OTHER VALUES, SECURITY WILL NOT BE SET ON DURING THE TEST. |
| P5 | SHIPMENT | 0x1234h | 0x5678h | 0xFFFFh 0xAA55h | xFFFFh | — | NORMAL MODE | OFF | MEMORY IS SHIPPED AFTER ERASING ALL DATA |

MICROCONTROLLER MANUFACTURER

FIG. 21B

| STEP | TIME SERIES | NONVOLATILE MEMORY I/F | | | NONVOLATILE MEMORY | VALUE WRITTEN TO LCA (LOCK CODE) | MODE | SECURITY | COMMENTS |
|---|---|---|---|---|---|---|---|---|---|
| | | SECURITY CODES | | | STATE OF LOCK CODE STORAGE AREA (LCA) | | | | |
| | | SECURITY CODE A | SECURITY CODE B | SECURITY CODE C | | | | | |
| P6 | WRITE PROGRAM CODE | 0x1234h | 0x5678h | 0xFFFFh 0xAA55h | xFFFFh | - | NORMAL MODE | OFF | SINCE LOCK CODE AND SECURITY CODE MATCH, SECURITY IS OFF AND ACCESS IS ALLOWED |
| P7 | SET SECURITY ON | 0x1234h | 0x5678h | 0xFFFFh 0xAA55h | x1234h OR x5678h OR VALUE OTHER THAN 0xFFFFh OR 0xAA55h | x1234h OR x5678h OR VALUE OTHER THAN 0xFFFFh OR 0xAA55h | NORMAL MODE | ON | AFTER WRITING ALL PROGRAM CODE, WRITE LOCK CODE (x1234h OR x5678h OR VALUE OTHER THAN 0xFFFFh OR 0xAA55h) THAT MATCHES THE SECURITY LEVEL TO BE SET |
| P8 | NORMAL USE | 0x1234h | 0x5678h | 0xFFFFh 0xAA55h | x1234h OR x5678h OR VALUE OTHER THAN 0xFFFFh OR 0xAA55h | - | NORMAL MODE | ON | SECURITY ON AND EXTERNAL READ/WRITE NOT PERMITTED |
| P9 | SYSTEM MANUFACTURER DESIRES TO CORRECT PROGRAM CODE | 0x1234h | 0x5678h | 0xFFFFh 0xAA55h | xFFFFh (STATE AFTER CHIP ERASE) | xFFFFh (CHIP ERASE) | NORMAL MODE | OFF | ONLY WAY TO CORRECT PROGRAM CODE IS TO FIRST PERFORM CHIP ERASE, WHEREUPON SECURITY IS UNLOCKED AND READ/WRITE PERMITTED. AFTER WRITING NEW PROGRAM CODE, LOCK CODE IS WRITTEN TO SET SECURITY ON SAME AS STEP P7. |

SYSTEM MANUFACTURER: P6–P7
END USER: P8–P9

FIG.21C

| STEP | TIME SERIES | NONVOLATILE MEMORY I/F SECURITY CODES | | | NONVOLATILE MEMORY | | MODE | SECURITY | COMMENTS |
|---|---|---|---|---|---|---|---|---|---|
| | | SECURITY CODE A | SECURITY CODE B | SECURITY CODE C | STATE OF LOCK CODE STORAGE AREA (LCA) | VALUE WRITTEN TO LCA (LOCK CODE) | | | |
| P10 | DEFECTIVE PRODUCT | 0x1234h | 0x5678h | 0xFFFFh, 0xAA55h | 0x1234h | — | NORMAL MODE | ON | SINCE SECURITY REMAINS ON, NO CHOICE BUT TO PERFORM CHIP ERASE AND NOT POSSIBLE TO CHECK FAULT CONDITION |
| | | | | | 0x5678h | — | | | |
| | | | | | OTHER THAN x1234h, x5678h, 0xFFFFh, 0xAA55h | — | | ON | IF SERIAL KEY IS ENTERED AND MODE IS SWITCHED TO TEST MODE, SECURITY IS AGAIN SET ON THEREFORE. NO CHOICE BUT TO PERFORM CHIP ERASE AND NOT POSSIBLE TO CHECK FAULT CONDITION |
| P11 | DEFECTIVE PRODUCT | 0x1234h | 0x5678h | 0xFFFFh, 0xAA55h | 0x1234h | — | TEST MODE | ON SECURITY LEVEL 1 COMMAND DESIRED TO BE USED FOR INITIAL ANALYSIS IS ACCEPTABLE | BY ENTERING SERIAL KEY AND SWITCHING TO TEST MODE, COMMAND DESIRED TO BE USED FOR INITIAL ANALYSIS BECOMES ACCEPTABLE |
| | | | | | 0x5678h | — | | OFF | BY ENTERING SERIAL KEY AND SWITCHING TO TEST MODE, SECURITY IS SET OFF. FAULT CONDITION CAN BE CHECKED. *IT IS ASSUMED HERE THAT SWITCHING TO TEST MODE CAN BE EFFECTED BY ENTERING SERIAL KEY. |
| | | | | | OTHER THAN x1234h, x5678h, 0xFFFFh, 0xAA55h | — | | | |

SYSTEM MANUFACTURER / MICROCONTROLLER MANUFACTURER

SEMICONDUCTOR DEVICE

CROSS-REFERENCE TO RELATED APPLICATION

This application is based upon and claims the benefit of priority of the prior Japanese Patent Application No. 2011-011243, filed on Jan. 21, 2011, the entire contents of which are incorporated herein by reference.

FIELD

The embodiments discussed herein are related to a semiconductor device.

BACKGROUND

In recent years, semiconductor devices mounted with nonvolatile memories have been used in a variety of fields. Specifically, microcontrollers mounted with nonvolatile memories such as flash memories, for example, have been used in various kinds of household electrical appliances and information apparatus or in automobile control systems and the like.

In the flash memory of a microcontroller, for example, information such as a program for controlling the microcontroller is written by a system manufacturer, and to protect the information written in the flash memory against illegal access from a malicious third party, security technology has been developed.

On the other hand, when an unexpected fault occurs in the microcontroller, it is common practice for the microcontroller manufacturer to analyze the cause of the fault, for example, by examining the information written in the flash memory mounted on the microcontroller.

Microcontrollers mounted with the type of nonvolatile memory to which security technology is applied, as described above, have been proposed in the related art, but in this type of memory, once the security is set ON, no other operation than a total erasure (chip erase) is allowed on the nonvolatile memory.

There may also arise cases where a certain kind of fault (failure) occurs, for example, when the end user is using a microcontroller-equipped product in the field, and the microcontroller is returned to the system manufacturer and then to the microcontroller manufacturer for analysis of the fault.

Here, if the fault is, for example, of the type that occurs when the program stored in the nonvolatile memory is executed but that is unable to be checked once a chip erase of the nonvolatile memory is done, it is not possible to analyze the fault at the microcontroller manufacturer.

That is, in the case of a microcontroller incorporating a nonvolatile memory equipped with the security function according to the related art, since no other operation than a chip erase is allowed on the nonvolatile memory once the security is set ON, the microcontroller manufacturer is unable to check the fault condition.

On the other hand, in the case of a microcontroller incorporating a nonvolatile memory not equipped with such a security function, it is possible to analyze the fault at the microcontroller manufacturer, but the system manufacturer tends to avoid using such a microcontroller because of its inability to provide protection against illegal access from a malicious third party.

In the related art, there have been proposed various kinds of microcontrollers mounted with nonvolatile memories to which security technology is applied.

Patent Document 1: Japanese Laid-open Patent Publication No. H10-301855
Patent Document 2: Japanese Laid-open Patent Publication No. 2004-227509
Patent Document 3: Japanese Laid-open Patent Publication No. 2003-263368
Patent Document 4: Japanese Laid-open Patent Publication No. H07-271751
Patent Document 5: Japanese Laid-open Patent Publication No. H09-198316
Patent Document 6: Japanese Laid-open Patent Publication No. 2004-288257

SUMMARY

According to an aspect of the embodiments, a semiconductor device includes a nonvolatile memory, and an interface configured to transfer data to and from the nonvolatile memory.

The interface includes a security logic unit which controls a security level for the data written to the nonvolatile memory, in accordance with a plurality of preset security codes and a lock code that is written to a specific area in the nonvolatile memory.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 1 is a block diagram illustrating one example of a semiconductor device;

FIG. 2 is a diagram for explaining how the security ON/OFF states are defined in relation to accesses;

FIG. 3 is a diagram for explaining the names of the security codes for a pre-shipment test mode and a user operation normal mode, respectively, and their storage locations;

FIG. 4 is a diagram for explaining the relationship between the test mode, the normal mode, and the security ON/OFF states in the semiconductor device according to the present invention;

FIG. 18 is a diagram for explaining examples of the lock code to be written by the system manufacturer and applicable to the semiconductor device of the present embodiment, and the effect of the lock code.

FIG. 19 is a diagram for explaining command permit/deny status for each lock code example in the normal mode and the test mode, respectively, according to the semiconductor device of the present embodiment;

FIG. 20 is a diagram for explaining the security ON/OFF states in the normal mode and the test mode, respectively, with reference to data stored in a lock code storage area according to the semiconductor device of the present embodiment; and FIG. 21A, FIG. 21B and FIG. 21C are diagrams for explaining in time-series fashion the security codes and lock codes used with the semiconductor device of the present embodiment.

DESCRIPTION OF EMBODIMENTS

Figure 5:
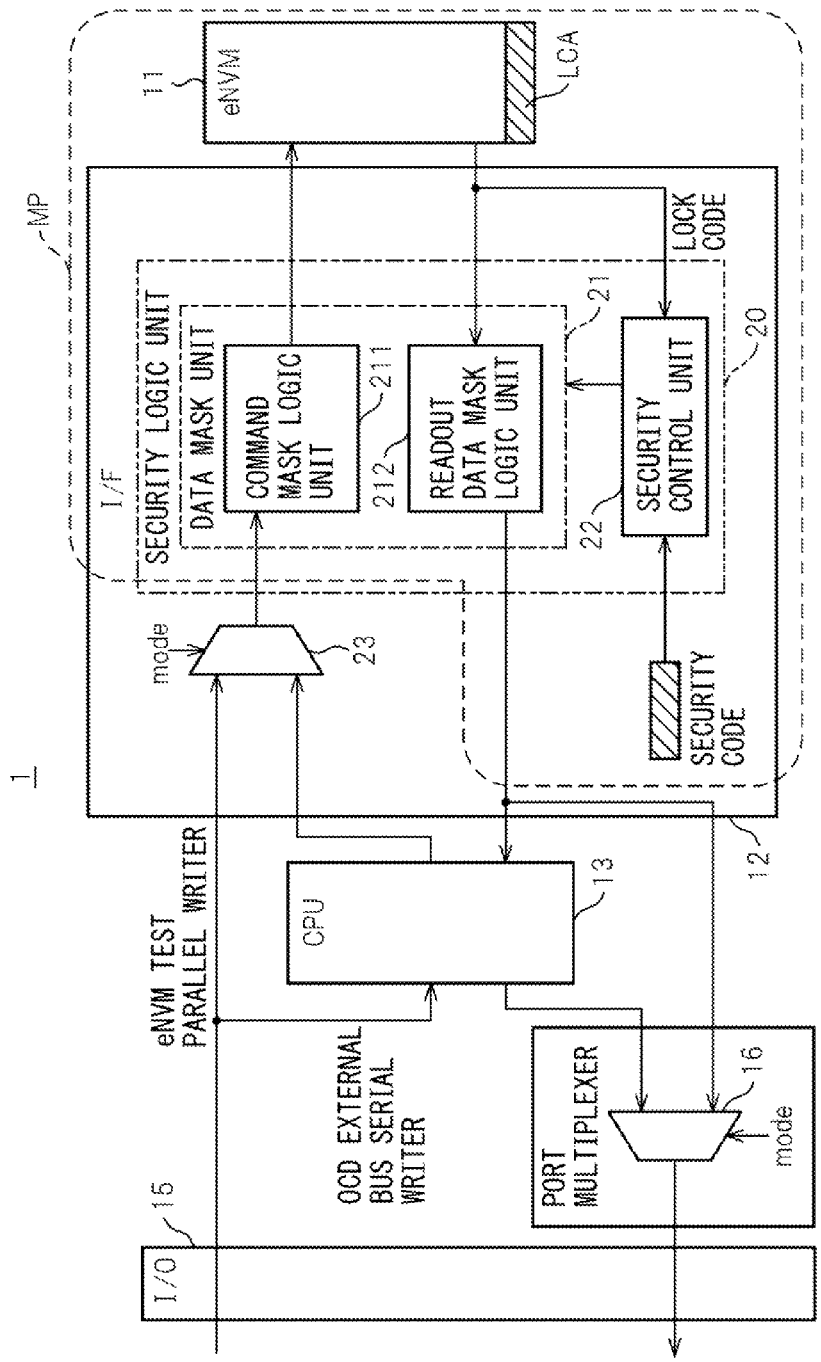
FIG. 5 is a block diagram schematically illustrating the semiconductor memory according to the present invention.

Before describing the embodiments of a semiconductor device in detail, the semiconductor device and the problem associated with it will be described below with reference to FIG. 1 and FIG. 2.

FIG. 1 is a block diagram illustrating one example of the semiconductor device for explaining the kinds of accesses that may be made to a nonvolatile memory and the meaning of security. FIG. 2 is a diagram for explaining how the security ON/OFF states are defined in relation to the accesses.

In FIG. 1, reference numeral 1 is the semiconductor device (microcontroller), 11 is the nonvolatile memory, 12 is an interface (I/F), 13 is a CPU (Central Processing Unit), and 14 is an on-chip debugger (OCD).

The microcontroller 1 thus includes the nonvolatile memory 11, the interface 12, the CPU 13, and the OCD 14.

The nonvolatile memory 11 is, for example, a semiconductor storage device such as a flash memory or an EEPROM, and information such as a program for controlling the microcontroller 1 (the CPU 13) is written into it by a system manufacturer.

The OCD 14 is a debugger that utilizes the emulation control, break, trace, and other functions built into the microcontroller 1, and may make 100% use of the target resource at the time of debugging.

The kinds of accesses that may be made to the nonvolatile memory 11 include, for example, an on-chip debug (OCD) mode AM1, an external bus mode AM2, a writer mode AM3, and a CPU mode AM4.

The OCD mode AM1 is a mode that allows the OCD 14 to freely access by taking over the CPU 13, and the external bus mode AM2 is a mode that uses an external bus connecting between the microcontroller 1 and an external circuit. Here, if, for example, a memory is placed on the external bus, it becomes possible to fetch data from the nonvolatile memory 11 and place it into the memory.

The writer mode AM3 is a mode that allows data to be written directly to the nonvolatile memory 11 without the intervention of the CPU 13 by using, for example, a special parallel writer. The CPU mode AM4 is a mode that accesses the nonvolatile memory 11 by using an internal bus connecting between internal circuits, and allows access to the nonvolatile memory 11 without limitation. The parallel writer may be used, for example, only for off-board writing.

As illustrated in FIG. 2, once the security is set ON by the system manufacturer after writing information such as a program for controlling the CPU 13 into the nonvolatile memory 11, no other access (external access) than the one for total erasure (chip erase) is allowed, except in the CPU mode AM4.

That is, when the security is OFF, the external access to the nonvolatile memory 11 is accepted for any of erase, read, and write instructions (erase, read, and write operations are all possible), but when the security is ON, only "chip erase" is accepted.

As for the access from the CPU 13 to the nonvolatile memory 11, erase, read, and write operations are all possible, whether the security is set ON or OFF.

As a result, once the security has been set ON, if a fault, for example, occurs in the microcontroller-equipped product in the field, and the microcontroller is returned to the microcontroller manufacturer, it is difficult to reproduce the actual fault condition and fully analyze the fault.

On the other hand, if the microcontroller-equipped product is put on the market without setting the security ON, the information stored in the nonvolatile memory may be erased, read, or written freely by a third parity, which is not desirable from the standpoint of the system manufacturer, nor is it realistic to market such a product.

The embodiments of the semiconductor device will be described in detail below with reference to the accompanying drawings. FIG. 3 is a diagram for explaining the names of the security codes for a pre-shipment test mode and a user operation normal mode, respectively, and their storage locations. FIG. 4 is a diagram for explaining the relationship between the test mode, the normal mode, and the security ON/OFF states in the semiconductor device according to the present invention.

The semiconductor device (microcontroller) 1 is designed to have built-in security codes, such as the test security code for the pre-shipment test mode and the user security code for the system manufacturer/end user operation normal mode, as illustrated in FIG. 3.

Here, the security codes (the test security code and the user security code) are set as prefixed expected values in the interface 12.

That is, the test security code and the user security code are, for example, either burned-in to the interface 12 by using a mask at the time of manufacture or physically set by power supply clamping such as fuse blowing.

Security control is performed by comparing the test security code and the user security code with a lock code stored, for example, in a specific area (lock code storage area LCA) in the nonvolatile memory. Then, mode switching logic for switching between the test mode and the normal mode is constructed.

The number of bits used to construct the security code and the lock code depends, for example, on the microcontroller. Here, the user security code is used, for example, by the microcontroller system manufacturer that writes the created (developed) program to the nonvolatile memory 11.

That is, as illustrated in FIG. 4, in the test mode, the security is set ON when the security code matches the lock code, and set OFF when the security code does not match the lock code.

On the other hand, in the normal mode, the security is set OFF when the security code matches the lock code, and set ON when the security code does not match the lock code.

In the test mode, the security is set OFF when the security code does not match the lock code, as just described; taking advantage of this, it is possible to perform read/write/erase fault analysis (initial analysis) on the nonvolatile memory.

The lock code is written into the nonvolatile memory 11 by the system manufacturer; as will be described in detail later, it is preferable to use as the lock code storage area the memory area of the address to be erased last in the address space of the nonvolatile memory 11.

In this way, according to the semiconductor memory of the present invention, by switching from the normal mode to the test mode, it becomes possible to easily select whether to enable or not enable fault analysis in the event of a fault, without lowering the security level compared with any prior art system for the data stored in the nonvolatile memory mounted on the semiconductor device.

That is, it becomes possible to properly control the security level for each mode (the normal mode and the test mode).

Figure 6:
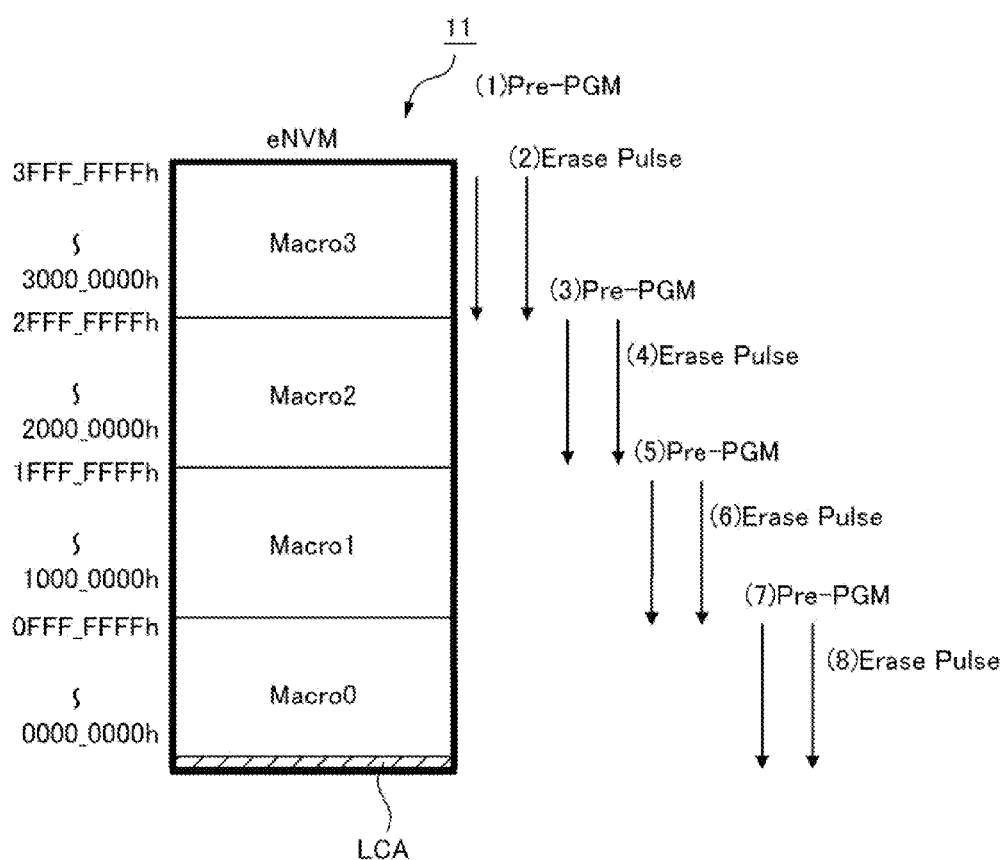
FIG. 6 is a diagram for explaining the sequence of chip erase for data storage areas when the semiconductor memory illustrated in FIG. 5 includes a plurality of nonvolatile memories.

FIG. 5 is a block diagram schematically illustrating the semiconductor memory according to the present invention, and FIG. 6 is a diagram for explaining the sequence of chip erase for data storage areas when the semiconductor memory illustrated in FIG. 5 includes a plurality of nonvolatile memories.

In FIG. 5, the area MP enclosed by a dashed line corresponds to the area depicted in the block diagrams of a first embodiment illustrated in FIG. 9 and FIG. 10 or the area depicted in the block diagrams of a second embodiment illustrated in FIG. 13 and FIG. 14 to be described later.

As illustrated in FIG. 5, the semiconductor device (microcontroller) 1 includes the nonvolatile memory 11, the interface (I/F) 12, the CPU 13, an input/output (I/O) unit 15, and a port multiplexer 16.

The interface 12 includes a security logic unit 20, which includes a data mask unit 21 and a security control unit 22, and a multiplexer 23, and the data mask unit 21 includes a command mask logic unit 211 and a readout data mask logic unit 212.

The nonvolatile memory 11 here is an embedded nonvolatile memory or flash memory (eNVM), a portion of which is allocated as the lock code storage area LCA which the user, such as the system manufacturer, uses to control security.

It is preferable to set the lock code storage area LCA in an address area that is to be erased last in the address space of the eNVM 11. This is to ensure that when the lock code is erased, there are no data remaining unerased at the other addresses in the nonvolatile memory 11.

More specifically, when the nonvolatile memory 11 has a plurality of flash macros (for example, four flash macros Macros 0 to 3) as illustrated in FIG. 6, for example, first a pre-program ((1) Pre-PGM) and an erasure ((2) Erase Pulse) are applied to Macro 3.

Then, (3) Pre-PGM and (4) Erase Pulse are applied to Macro 2, then (5) Pre-PGM and (6) Erase Pulse are applied to Macro 1, and finally, (7) Pre-PGM and (8) Erase Pulse are applied to Macro 0; the LCA is provided in the last area in Macro 0 to be erased last.

That is, the macros that do not have LCA (Macros 3 to 1) are erased first, and the macro that has LCA (Macro 0) is erased last. Here, a status flag capable of detecting the completion of Pre-PGM is monitored and, after confirming the completion of Pre-PGM for the macros that do not have LCA (Macros 3 to 1), the erasure operation of the macro that has LCA (Macro 0) is initiated.

Accordingly, after a total erasure (chip erase) command has been issued to the first Macro 3 in the security ON state, if the process has stopped, for example, due to a fault before the completion of Pre-PGM, the presence of LCA serves to ensure the security.

That is, since the last Macro 0 that has LCA is erased and the security unlocked only after confirming the completion of Pre-PGM for Macros 3 to 1, the security for Macros 3 to 1 (Macros 3 to 0) is ensured.

The multiplexer 23 selects, under the control of a mode signal "mode", either external data (data from nonvolatile memory or data from eNVM test parallel writer) or data from the CPU 13, and supplies the selected data to the data mask unit 21 (command mask logic unit 211).

On the other hand, the port multiplexer 16 selects, under the control of the mode signal "mode", either the data from the data mask unit 21 (readout data mask logic unit 212) or the data from the CPU 13, and supplies the selected data to an external device.

Here, the security codes (the test security code and the user security code) are, for example, either burned-in to the interface 12 by using a mask at the time of manufacture or physically set by power supply clamping such as fuse blowing. Further, the number of bits used to construct the security codes depends, for example, on the microcontroller, as previously described.

Figure 7:
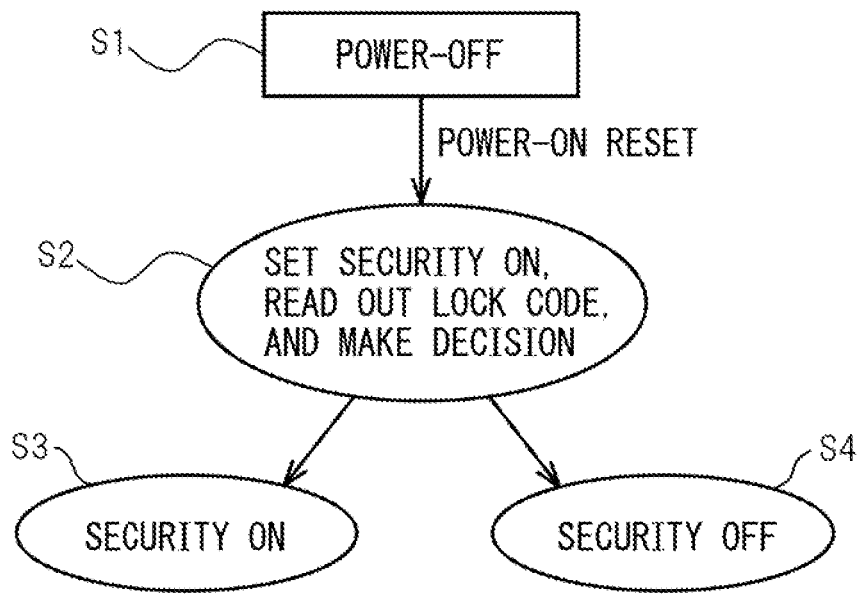
FIG. 7 is a diagram for explaining state transitions during a power-on reset in the semiconductor device depicted in FIG. 5.
Figure 8:
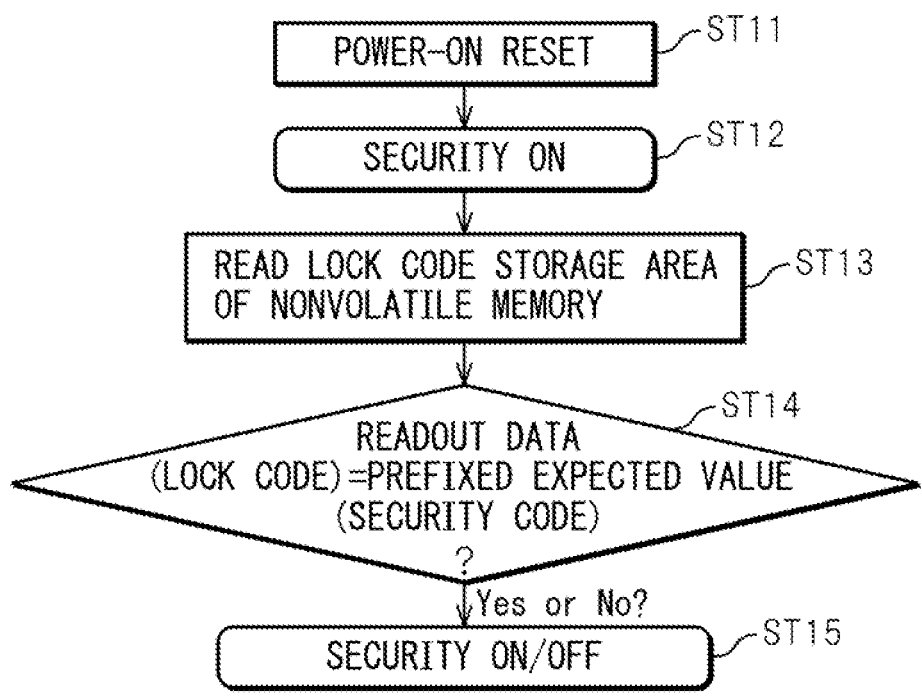
FIG. 8 is a flowchart for explaining the operation performed after the power-on reset in the semiconductor device depicted in FIG. 5.

FIG. 7 is a diagram for explaining state transitions during a power-on reset in the semiconductor device depicted in FIG. 5, and FIG. 8 is a flowchart for explaining the operation performed after the power-on reset in the semiconductor device depicted in FIG. 5.

As illustrated in FIG. 7, when power is turned on from a power-off state S1, power-on reset initialization is performed in state S2, to set the security ON, read out the lock code, and make a decision.

Then, in accordance with the result of the decision made in state S2, a transition is made to the security ON state S3 or the security OFF state S4.

As illustrated in FIG. 8, when a power-on reset is performed in step ST11, a transition is made to the security ON state in ST12, and the process proceeds to step ST13 to read out the data stored in the lock code storage area LCA of the nonvolatile memory 11.

The process further proceeds to step ST14 where the data (lock code) read out of the LCA is compared with the prefixed expected value (the security code preset in the interface 12).

Then, a transition is made to state ST15. In the test mode, if the test security code matches the lock code in step ST14, the security is set ON, but if the test security code does not match the lock code, the security is set OFF.

On the other hand, in the normal mode, if the user security code matches the lock code in step ST14, the security is set OFF, but if the user security code does not match the lock code, the security is set ON.

Figure 9:
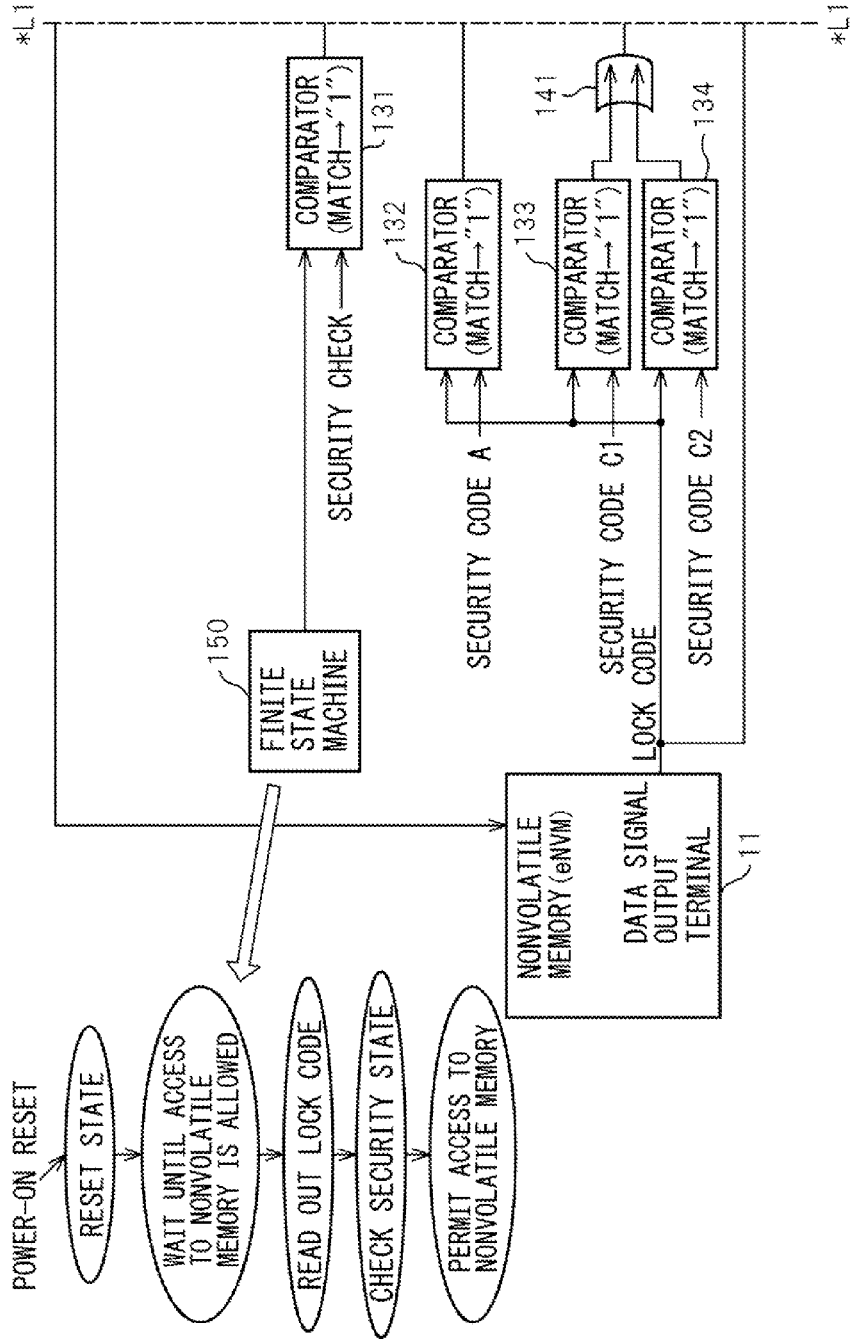
FIG. 9 is a block diagram (part 1) illustrating a first embodiment of a dashed-line area MP in FIG. 5.
Figure 10:
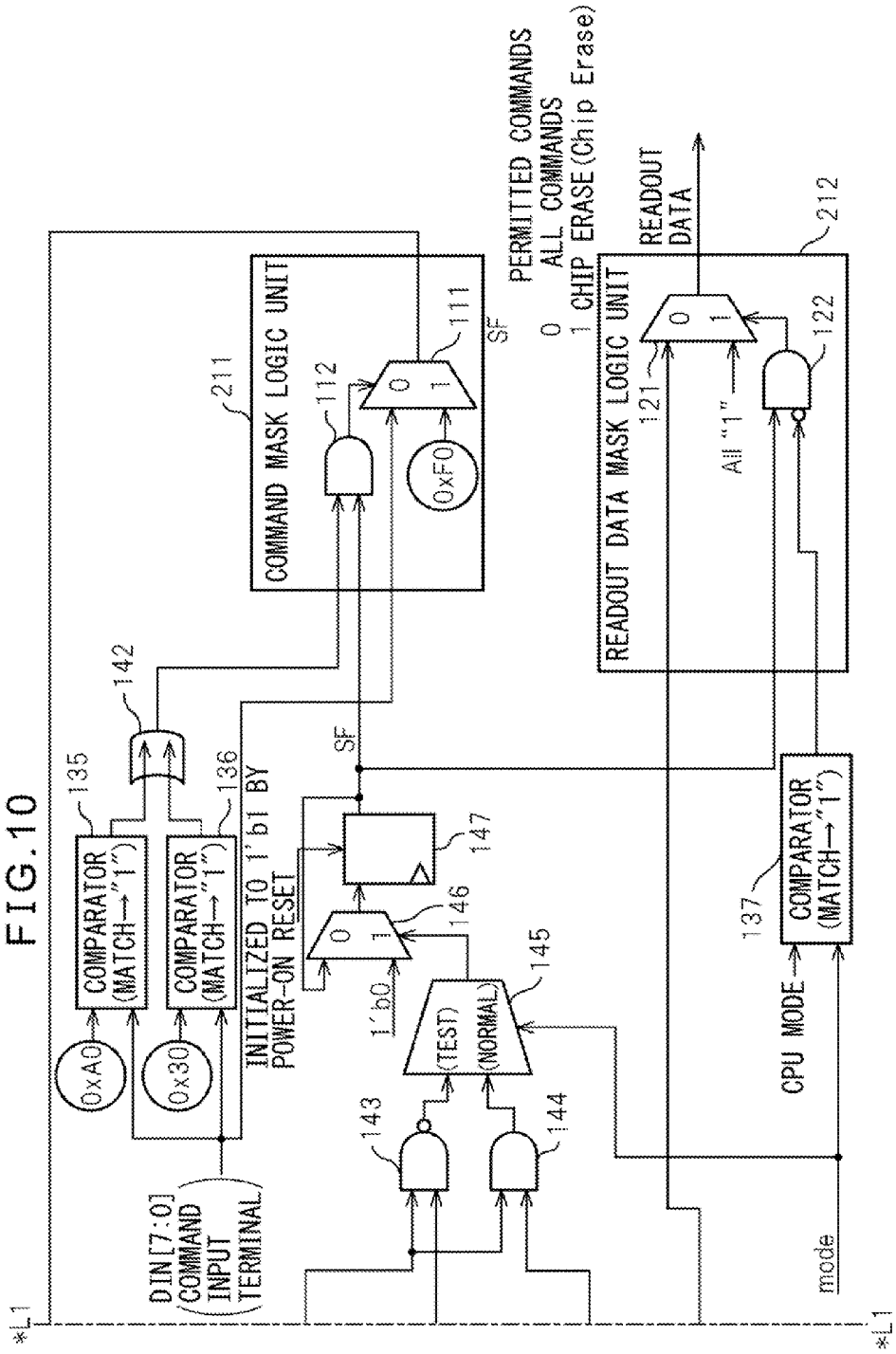
FIG. 10 is a block diagram (part 2) illustrating the first embodiment of the dashed-line area MP in FIG. 5.
Figure 11:
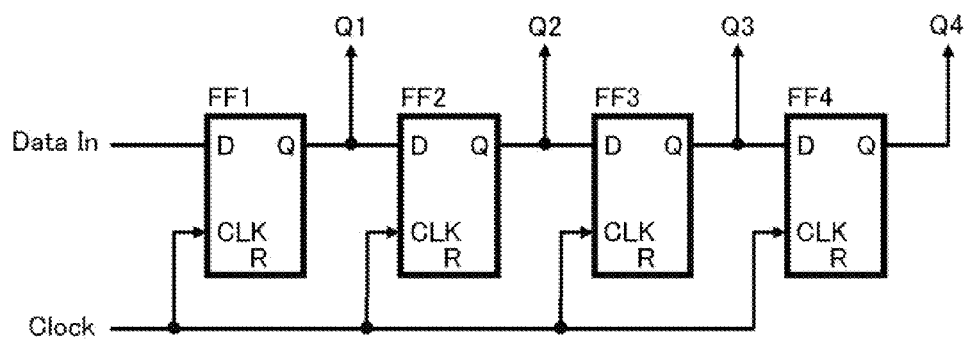
FIG. 11 is a diagram for explaining a serial key input as one example of an external input applied to the semiconductor device of FIG. 9 and FIG. 10 to effect mode switching.

FIG. 9 and FIG. 10 are block diagrams illustrating the first embodiment of the dashed-line area MP depicted in FIG. 5, and FIG. 11 is a diagram for explaining a serial key input as one example of an external input applied to the semiconductor device of FIG. 9 and FIG. 10 to effect mode switching.

In FIG. 9 and FIG. 10, the component elements, except the nonvolatile memory (eNVM) 11, the command mask logic unit 211, and the readout data mask logic unit 212, constitute the security control unit 22.

As illustrated in FIG. 9 and FIG. 10, the security control unit 22 in FIG. 5 includes a plurality of comparators 131 to 137, OR gates 141 and 142, a NAND gate 143, an AND gate 144, selectors 145 and 146, a flip-flop 147, and a finite state machine 150.

The finite state machine 150, after waiting for the state to change from the reset state to the state that allows access to the nonvolatile memory 11, reads out the lock code stored in the LCA, checks the security state, and permits access to the nonvolatile memory 11.

Each of the comparators 131 to 137 is configured to output "1" if the comparison result indicates a match. The comparator 132 compares the security code A (first security code: test security code) with the lock code read out of the nonvolatile memory 11. The security code A corresponds, for example, to 0x1234h to be described later with reference to FIG. 17.

On the other hand, the comparators 133 and 134 compare the security codes C1 and C2 (second security code: user security code), respectively, with the lock code read out of the nonvolatile memory 11. The security codes C1 and C2 correspond, for example, to 0xFFFFh and 0xAA55h, respectively, to be described later with reference to FIG. 17.

The outputs of the comparators 131 and 132 are supplied to the NAND gate 143; the outputs of the comparators 133 and 134 are supplied to the OR gate 141; the output of the comparator 131 and the output of the OR gate 141 are supplied to the AND gate 144; and the outputs of the gates 143 and 144 are supplied to the selector 145.

The selector 145 selects either the test mode or the normal mode in accordance with the serial key Q1 to Q4 (the mode signal "mode") generated, for example, by a plurality of flip-flops FF1 to FF4 such as depicted in FIG. 11.

First, serial data are applied from the data input (Data In) to the flip-flops FF1 to FF4 to write the 4-bit serial key Q1 to Q4 in synchronism with a clock (Clock).

Then, the serial key Q1 to Q4 stored in the flip-flops FF1 to FF4 is read out and applied as the mode signal "mode", based on which either the test mode or the normal mode is selected. Here, it will be appreciated that the serial key is not limited to the 4-bit structure, but various other bit configurations may be used.

The selector (multiplexer) 146 is controlled by the output of the selector 145, and the output of the selector 146 is supplied as a security flag SF via the flip-flop 147 to the command mask logic unit 211 and the readout data mask logic unit 212.

The command mask logic unit 211 includes an AND gate 112 to which the output of the OR gate 142 and the security flag SF are supplied as inputs, and a selector 111 which is controlled by the output of the AND gate 112.

The outputs of the comparators 135 and 136 are supplied to the OR gate 142; here, the comparators 135 and 136 compare a signal DIN[7:0], supplied via a command input terminal, with signals 0xA0 and 0x30, respectively. The selector 111 receives the signals DIN[7:0] and 0xF0 as inputs, and supplies to the non-volatile memory 11 the signal selected under the control of the output of the AND gate 112.

The signals 0xA0 and 0x30 supplied to the comparators 135 and 136, respectively, and the signal 0xF0 supplied to the selector 111 assume the use of a JEDEC standard command set, but they are not limited to the use of this particular set.

The readout data mask logic unit 212 includes an AND gate 122 which receives the output of the comparator 137 at its inverting input and the security flag SF at its non-inverting input, and a selector 121 which is controlled by the output of the AND gate 122. The comparator 137 compares the mode signal "mode" (for example, the serial key) with the CPU mode (AM4).

In the semiconductor device of the first embodiment, when the security flag is "0", all commands are permitted, thus permitting all types of access, i.e., erase, read, and write, to the non-volatile memory 11.

On the other hand, when the SF is "1", only the "chip erase" command is permitted, permitting only the chip erase of the non-volatile memory 11 and prohibiting other types of access such as read and write.

The serial key (the mode signal "mode") is managed, for example, by the microcontroller manufacturer, and when it is desired to set the semiconductor device (microcontroller) to the test mode, the microcontroller manufacturer inputs the serial key from an external device.

Figure 12:
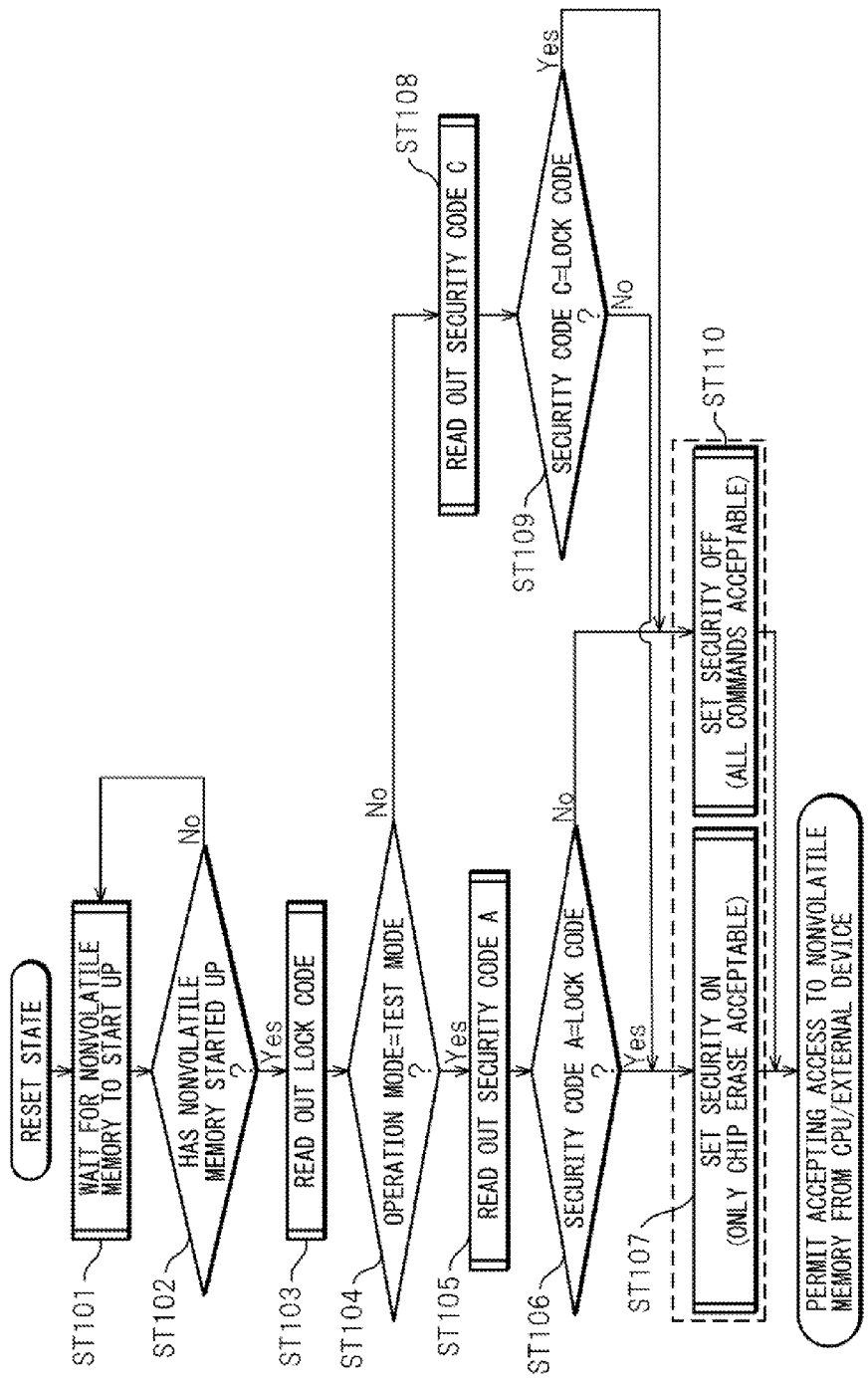
FIG. 12 is a flowchart for explaining the operation of a security logic unit in the semiconductor device depicted in FIG. 9 and FIG. 10.

FIG. 12 is a flowchart for explaining the operation of the security logic unit in the semiconductor device depicted in FIG. 9 and FIG. 10. First, if the mode to be verified later in step ST104 is, for example, the test mode, the serial key Q1 to Q4 is input in advance in the reset state.

When a reset (power-on reset) is performed, the process waits in step ST101 for the non-volatile memory 11 to start up, and when it is determined in step ST102 that the non-volatile memory 11 has started up, the process proceeds to step ST103 to read the lock code from the LCA.

Next, in step ST104, it is determined whether the operation mode is the test mode or not. If it is determined in step ST104 that the operation mode is the test mode, the process proceeds to step ST105 to read out the security code A (test security code).

The process further proceeds to step ST106 to determine whether the security code A matches the lock code. If it is determined in step ST106 that the security code A matches the lock code, the process proceeds to step ST107 to set the security ON.

At this time, only the "chip erase" command is acceptable for the non-volatile memory 11, and it is not possible to perform other operations such as reading the data stored in the non-volatile memory 11 from the outside.

That is, in the test mode, if the same code as the test security code preset in the interface 12, for example, is stored in the lock code storage area LCA of the non-volatile memory 11, the security is set ON, prohibiting all types of access other than "chip erase".

On the other hand, if it is determined in step ST106 that the security code A does not match the lock code, the process proceeds to step ST110 to set the security OFF. At this time, it becomes possible to accept all kinds of commands, such as read, write, and erase, from the outside for the non-volatile memory 11.

If, in step ST104, it is determined that the operation mode is not the test mode, that is, the operation mode is the normal mode, the process proceeds to step ST108 to read out the security code C (user security code).

The process further proceeds to step ST109 to determine whether the security code C matches the lock code. If it is determined in step ST109 that the security code C matches the lock code, the process proceeds to step ST110 to set the security OFF.

On the other hand, if it is determined in step ST109 that the security code C does not match the lock code, the process proceeds to step ST107 to set the security ON.

When the security is set in step ST107 or ST110 as described above, the access from the CPU 13 or from the outside to the non-volatile memory 11 is permitted (or limited) accordingly. No access from the CPU or from the outside will be accepted until after the security is set in step ST107 or ST110.

In this way, according to the semiconductor device of the first embodiment (a microcontroller incorporating a nonvolatile memory), in order to allow erase, read, and write operations to be performed in the pre-shipment test by the microcontroller manufacturer, provisions may be made to prevent the security from being set ON before conducting the test or during the test.

For example, if provisions are made not to write the same code as the security code A (test security code) to the LCA when the system manufacturer writes a program code into the non-volatile memory, the security may be prevented from being set ON.

Further, after the system manufacturer has written the program code to the non-volatile memory, if the security is set ON, that is, if the same code as the security code A (test security code) is written to the LCA, the program code will not be read out by an external access.

Once the security is thus set ON, provisions may be made so that, if any malicious operation is attempted from the outside, the security will not be unlocked, except for "chip erase". Further, once the security has been set ON, if there arises a need in the field to correct the program code, the system manufacturer may be allowed to rewrite the program (writing after chip erase) and thereafter set the security ON.

Figure 13:
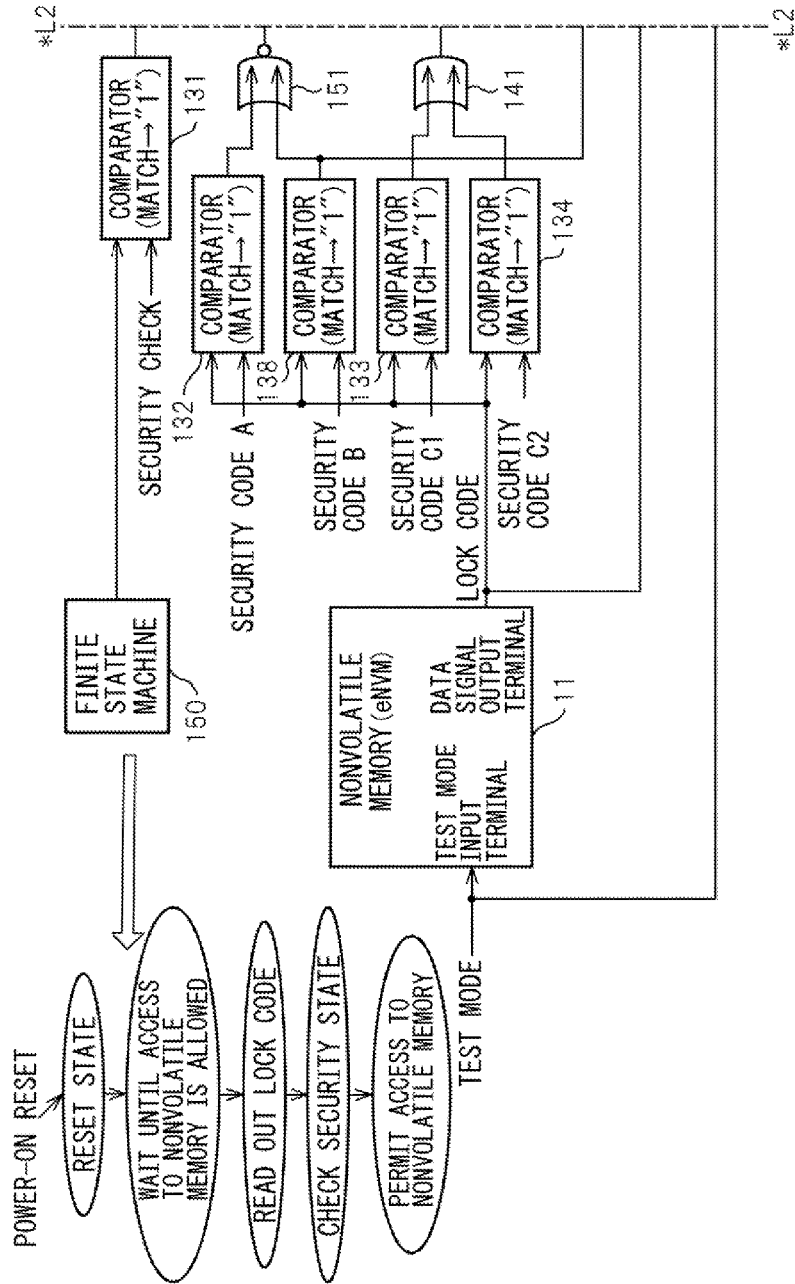
FIG. 13 is a block diagram (part 1) illustrating a second embodiment of the security logic unit in the semiconductor device depicted in FIG. 5.
Figure 14:
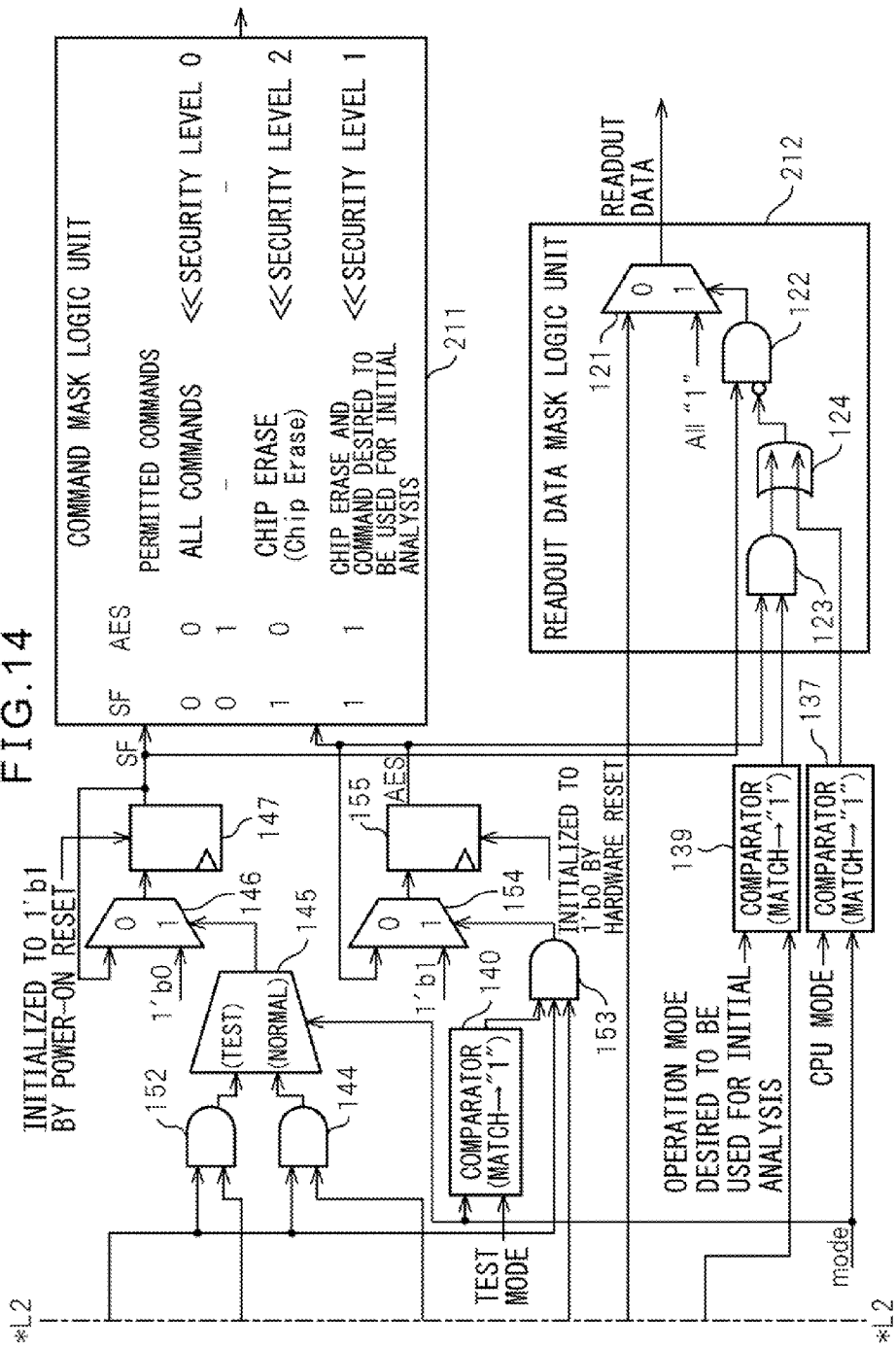
FIG. 14 is a block diagram (part 2) illustrating the second embodiment of the security logic unit in the semiconductor device depicted in FIG. 5.

FIG. 13 and FIG. 14 are block diagrams illustrating the second embodiment of the security logic unit in the semiconductor device depicted in FIG. 5; the illustrated portion corresponds to the dashed-line area MP depicted in FIG. 5.

As seen by comparing FIG. 13 and FIG. 14 with the previously given FIG. 9 and FIG. 10, the semiconductor device of the second embodiment differs by the inclusion of a comparator 138 which compares a security code B with the lock code read out of the nonvolatile memory 11.

The security code B (third security code: initial analysis security code) corresponds, for example, to 0x5678h to be described later with reference to FIG. 17.

The semiconductor device of the second embodiment further includes comparators 139 and 140, a NOR gate 151, AND gates 152 and 153, a selector 154, and a flip-flop 155.

The comparator 139 compares the test mode, a signal applied to a test mode input of the nonvolatile memory 11, with the operation mode desired to be used for initial analysis, and supplies its output to the readout data mask logic unit 212.

The comparator 140 is for comparing the test mode with the serial key (the mode signal "mode") to see whether they match, and supplies its output to the three-input AND gate 153 to which the outputs of the comparators 131 and 138 are also supplied.

The selector 154 is controlled by the output of the AND gate 153, and the output of the selector 154 is supplied as an analysis enabling signal AES via the flip-flop 155 to the command mask logic unit 211 and the readout data mask logic unit 212.

The readout data mask logic unit 212 includes, in addition to the selector 121 and the AND gate 122, an AND gate 123 and an OR gate 124. The AND gate 123 receives as its inputs the analysis enabling signal AES and the output of the comparator 139, and the OR gate 124 receives as its inputs the output of the AND gate 123 and the output of the comparator 137. The output of the OR gate 124 is supplied to the inverting input of the AND gate 122.

In the semiconductor device of the second embodiment, when the security flag is "0", and the analysis enabling signal AES is "0", all commands are permitted. That is, all types of access, i.e., erase, read, and write, to the non-volatile memory 11 are permitted (security level 0).

On the other hand, when the SF is "1", and the AES is "0", only the "chip erase" command is permitted, permitting only the chip erase of the non-volatile memory (security level 2) and prohibiting other types of access such as read and write.

Further, when the SF is "1", and the AES is "1", only the "chip erase" command and the command desired to be used for initial analysis (initial analysis command) are permitted; that is, only the chip erase of the non-volatile memory 11 and the initial analysis command are permitted (security level 1).

In this way, according to the semiconductor device of the second embodiment, by providing the security code B in addition to the security codes A and C, it becomes possible to accept the initial analysis command in the test mode.

Here, the security code B is not limited to one corresponding to one initial analysis command, but a plurality of security codes B may be provided so as to be able to set a larger number of security levels.

Figure 15:
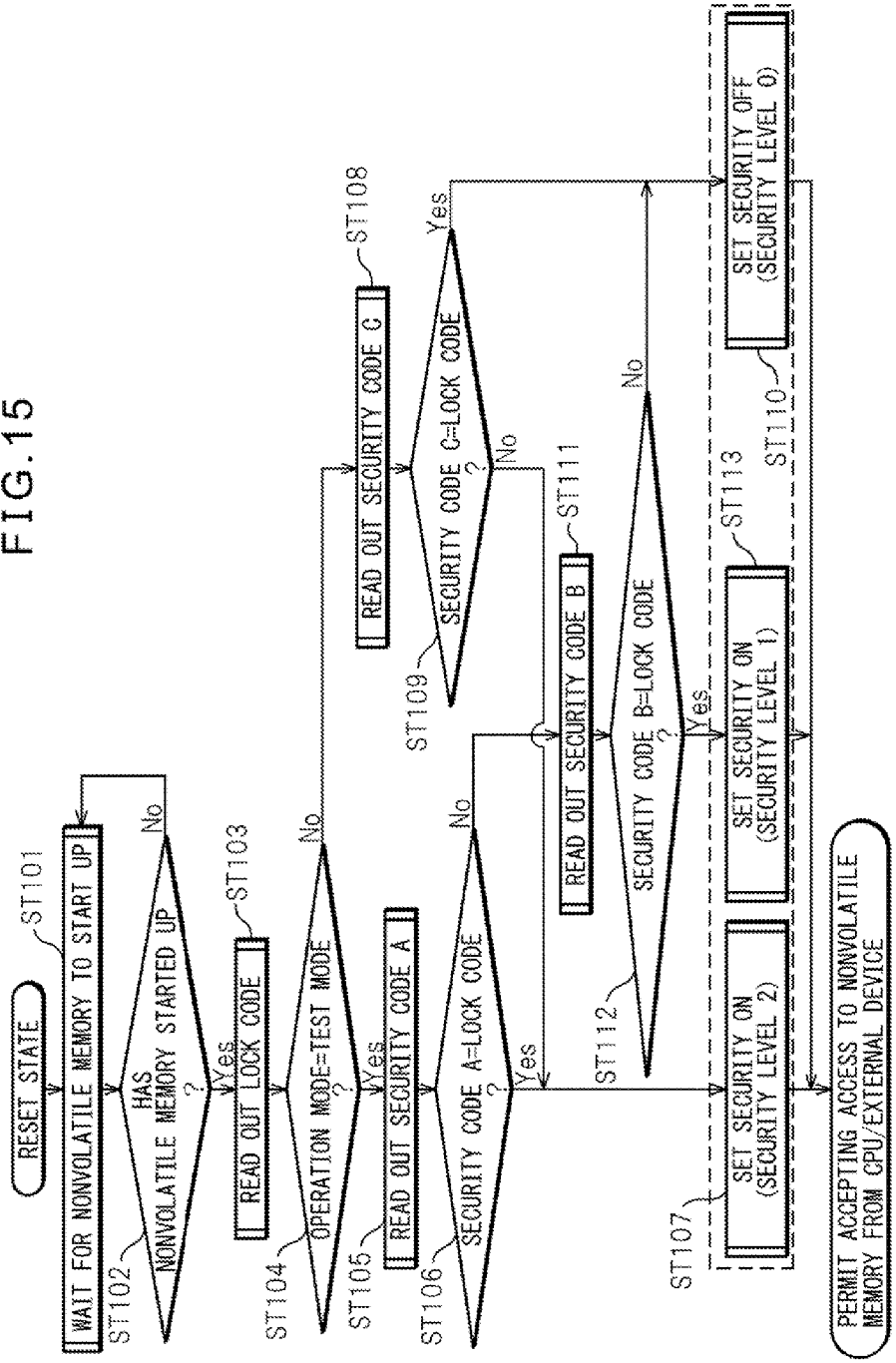
FIG. 15 is a flowchart for explaining the operation of the security logic unit in the semiconductor device depicted in FIG. 13 and FIG. 14.

FIG. 15 is a flowchart for explaining the operation of the security logic unit in the semiconductor device depicted in FIG. 13 and FIG. 14. FIG. 16 is a diagram for explaining one example of the function added in the second embodiment of the security logic unit in the semiconductor device depicted in FIG. 13 and FIG. 14.

As is apparent from a comparison of FIG. 15 with the previously given FIG. 12, the process from step ST101 to ST110 in the second embodiment of the semiconductor device depicted in FIG. 13 and FIG. 14 is substantially the same as the corresponding steps in the first embodiment.

Here, the security ON state in step ST107 corresponds to the security level 2 defined above, and the security OFF state in step ST110 corresponds to the security level 0 defined above.

In the previously given FIG. 12, if it is determined in step ST106 that the security code A does not match the lock code, the process proceeds to step ST110 to set the security OFF, but in FIG. 15, the process proceeds to step ST111.

That is, if it is determined in step ST106 that the security code A does not match the lock code, the process proceeds to step ST111 to read out the security code B (initial analysis security code); then, the process proceeds to step ST112.

If it is determined in step ST112 that the security code B matches the lock code, the process proceeds to step ST113 to set the security ON (security level 1).

The security level 1 differs from the security level 2 (security ON state) in step ST107 in that, while the security level 2 permits only the chip erase command, the security level 1 permits the initial analysis command as well.

That is, in the test mode, if the same code as the security code B (initial analysis security code) preset in the interface 12, for example, is stored in the lock code storage area LCA of the non-volatile memory 11, not only the chip erase but also fault analysis, for example, may be performed.

If it is determined in step ST112 that the security code B does not match the lock code, the process proceeds to step ST110 to set the security OFF (security level 0).

Figures 16, 17:
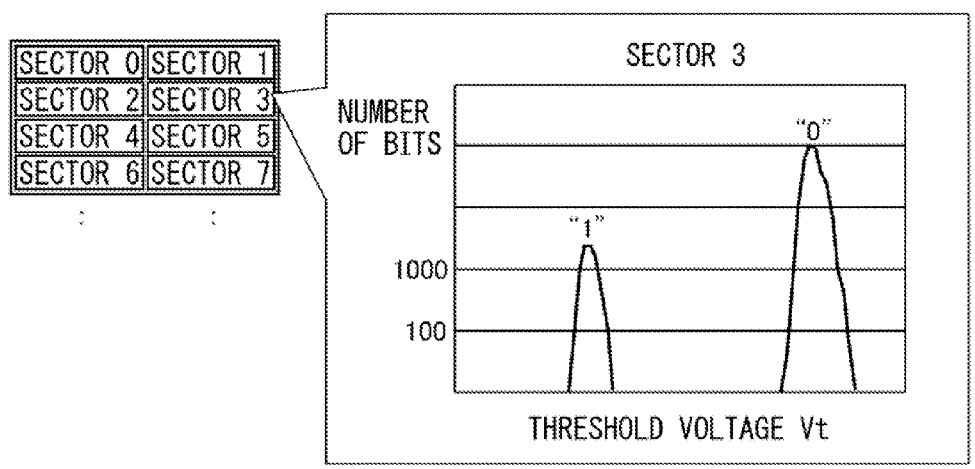
FIG. 16 is a diagram for explaining one example of the function added in the second embodiment of the security logic unit in the semiconductor device depicted in FIG. 13 and FIG. 14.
FIG. 17 is a diagram for explaining examples of the security codes applicable to the semiconductor device of the present embodiment.

The initial analysis command that becomes acceptable when the security code B matches the lock code implements, for example, the additional function such as depicted in FIG. 16.

That is, with the function depicted in the example of FIG. 16, it is not possible for the system manufacturer to read out the data itself written to the nonvolatile memory 11, but the system manufacturer is allowed to acquire the distribution of threshold voltages Vt for memory cells on a sector-by-sector basis (sector 0, sector 1, ... ).

More specifically, FIG. 16 depicts the relationship between the number of bits and the threshold voltage for the data written to sector 3, and fault analysis is performed based, for example, on the distribution of the memory cells with threshold voltages for data "1" and "0" as illustrated.

For example, when the microcontroller mounted with the nonvolatile memory failed in the field and was returned to the microcontroller manufacturer, if the same code as the security code B (initial analysis security code) is stored in the lock code storage area LCA of the non-volatile memory 11, it becomes possible to switch the mode to the test mode by entering a serial key and to perform, prior to the chip erase of the nonvolatile memory, fault analysis based on the sector-by-sector threshold voltage distribution.

The initial analysis command that becomes acceptable when the security code B matches the lock code is not limited to the above one that acquires the sector-by-sector threshold voltage distribution, but various other initial analysis commands may be selected at the design stage, and the number of such commands is not limited to 1.

In this way, according to the semiconductor device of the second embodiment, there is offered, in addition to the effect achieved with the semiconductor device of the foregoing first embodiment, the effect of allowing the system manufacturer to make provisions so as to enable the microcontroller manufacturer to perform fault analysis based on a designated initial analysis command in the event of a field failure of the nonvolatile memory.

That is, it becomes possible for the microcontroller manufacturer to perform fault analysis appropriate to the initial analysis security code prescribed (permitted) by the system manufacturer. The fault analysis here means locating a faulty bit within the memory or finding a faulty current, for example, by performing erase, read, or write operations.

FIG. 17 is a diagram for explaining examples of the security codes applicable to the semiconductor device of the present embodiment, and FIG. 18 is a diagram for explaining examples of the lock code to be written by the system manufacturer and applicable to the semiconductor device of the present embodiment, and the effect of the lock code.

FIG. 19 is a diagram for explaining the command permit/deny status for each lock code example in the normal mode and the test mode, respectively, according to the semiconductor device of the present embodiment. FIG. 20 is a diagram for explaining the security ON/OFF states in the normal mode and the test mode, respectively, with reference to the data stored in the lock code storage area according to the semiconductor device of the present embodiment, and more specifically a diagram for explaining, by using the lock code examples of FIG. 19, the relationship between the normal mode and test mode and the data stored in the lock code storage area.

First, as illustrated in FIG. 17, when the semiconductor device is a 16-bit microcontroller, the security code A (first security code: test security code) is set, for example, to 0x1234h.

The security code C (C1, C2: second security code: user security code) is set, for example, to 0xFFFFh or 0xAA55h, respectively.

The security code B (third security code: initial analysis security code) is set, for example, to 0x5678h. The security code B is also an instance of the test security code in the sense that it controls the security in the test mode.

These security codes A, B, and C are, for example, either burned-in to the interface 12 by using a mask at the time of manufacture or physically set by power supply clamping such as fuse blowing, as previously described.

Here, in the case of the security code C, if the chip erase of the nonvolatile memory 11, example, is performed, all the data in the memory cell array are cleared to "1", so that the lock code storage area LCA is also cleared to 0xFFFFh. It is therefore preferable to set the code 0xFFFFh corresponding to "all erase data" as the user security code (second security code) so that the security will not be set ON after the chip erase of the nonvolatile memory 11.

Further, in the pre-shipment test (FT test: final test) performed after packaging the microcontroller, for example, the security code C is treated as a normal mode code. Therefore, if a pattern that clears the LCA to 0xAA55 is used in the FT test, it is preferable to set the corresponding code 0xAA55 as the user security code.

This serves to prevent the security from being set ON during the FT test, and thus saves the trouble of unlocking the security by performing the chip erase, for example, even when the process proceeds to take remeasurements with the pattern used during the course of the test.

For the security codes A and B, the code 0xFFFFh, for example, is not usable because the security would then be set ON by the chip erase of the nonvolatile memory 11 performed during the test.

The security codes A and B are each set, for example, to a value that is far away from the value corresponding to the memory cell data after the process out. For example, when the nonvolatile memory is a flash memory, the memory cell data after the process out are more or less in a state close to all 1s, and accordingly, the value in the lock code storage area LCA is also close to 0xFFFFh.

That is, if a value (for example, 0xFFFEh) close to 0xFFFFh is set in the lock code storage area LCA of the flash memory, then when performing the test the probability increases that, after starting the test, the test security code matches the lock code and the security is thus set ON. It is therefore preferable to set each of the security codes A and B, for example, to a value far from 0xFFFFh.

FIG. 18 illustrates examples "a" to "c" of the lock code supplied to the user (for example, the system manufacturer), that is, the lock code that the user sets in the lock code storage area LCA, and examples of the security/initial analysis effect.

That is, as illustrated in FIG. 18 to FIG. 20, the system manufacturer (user), for example, is notified of the security codes A to C depicted in FIG. 17, and writes the lock codes "a" to "c" to the lock code storage area LCA.

More specifically, in the examples of the security codes A to C depicted in FIG. 17, first the lock code "a" (x1234h) is written to the LCA; then, since it matches the security code A, only the chip erase command is accepted, whether in the normal mode or in the test mode.

That is, the lock code "a" provides the highest security level (level 2), and it is not possible to unlock the security not only in the normal mode but also in the test mode; even when the microcontroller is returned to the microcontroller manufacturer due to a fault, only the chip erase may be performed.

Next, when the lock code "b" (x5678h) is written to the LCA, since it matches the security code B, only the chip erase command is accepted in the normal mode but, in the test mode, the chip erase command and the initial analysis command are both accepted.

That is, when the microcontroller is returned to the microcontroller manufacturer due to a fault, the lock code "b" allows the manufacturer to perform fault analysis, for example, based on the sector-by-sector threshold voltage distribution described with reference to FIG. 16, by setting the microcontroller in the test mode and without the need to perform the chip erase.

Further, when the lock code "c" (0xFFFFh, 0xAA55h, or a code other than x1234h or x5678h) is written to the LCA, only the chip erase command is accepted in the normal mode but, in the test mode, all of the write, read, and erase commands are accepted.

That is, the lock code "c" provides the lowest security level (level 0), and when the microcontroller is returned to the microcontroller manufacturer due to a fault, the lock code "c" allows the manufacturer to thoroughly perform initial analysis by setting the microcontroller in the test mode and without the need to perform the chip erase.

Here, the switching from the normal mode to the test mode may be effect at power-on reset, for example, by the microcontroller manufacturer applying a serial key to the microcontroller, as previously described.

FIG. 21A, FIG. 21B and FIG. 21C are diagrams for explaining in time-series fashion the security codes and lock codes used with the semiconductor device of the present embodiment; that is, the so far given description is summarized in time-series fashion for the microcontroller manufacturer, the system manufacturer, and the end user, respectively.

More specifically, FIG. 21A, FIG. 21B and FIG. 21C illustrate how the system manufacturer writes program code into the nonvolatile memory mounted in the microcontroller manufactured by the microcontroller manufacturer and how the product equipped with the microcontroller is offered to the market.

In the illustrated example, the product thus offered is delivered to the end user, where the program code is corrected (updated) by the system manufacturer, and in the event of a failure of the product, the microcontroller mounted on the product is returned to the microcontroller manufacturer via the system manufacturer.

First, the microcontroller manufacturer performs the process from process P1 (design) to process P5 (shipment), and delivers the product (the microcontroller mounted with the nonvolatile memory) to the system manufacturer. The system manufacturer writes the program code into the nonvolatile memory in step P8 and sets the security ON in step P7.

Here, in step P7, the system manufacturer writes to the lock code storage area LCA of the nonvolatile memory the lock code that matches the security level to be set, as previously described with reference to FIG. 17 to FIG. 19.

The microcontroller mounted with the nonvolatile memory into which the program code has been written by the system manufacturer is offered as an end product (for example, a household electric appliance, automobile, etc. equipped with the microcontroller) to the end user on the market.

Here, as illustrated in step P8, if any one of the lock codes "a" to "c" has been written by the system manufacturer, since the mode is the normal mode and the security is ON, the end user is unable to read or alter (write) the program code from the outside.

Further, as illustrated in step P9, when correcting (updating) the program code, the system manufacturer first performs chip erase, then writes a new program code, and thereafter writes the lock code to the LCA to set the security ON.

Step P10 illustrates the case where the end product equipped with the microcontroller fails in the field and the microcontroller thus rendered defective is returned to the system manufacturer. Step P11 illustrates the case where the defective microcontroller is returned from the system manufacturer to the microcontroller manufacturer.

In this case, since the mode is the normal mode and the security is ON, as illustrated in step P10, the system manufacturer has no choice but to perform the chip erase of the flash memory and is unable to check the fault condition.

By contrast, the microcontroller manufacturer is allowed to conduct a test that matches the security level set by the system manufacturer, for example, by entering a serial key from the outside and switching to the test mode, as illustrated in step P11.

More specifically, as previously described with reference to FIG. 18 to FIG. 20, in the examples of the security codes A to C depicted in FIG. 17, if x1234h is written to the LCA, since the lock code matches the security code A, only the chip erase is allowed even in the test mode, and it is not possible to check the fault condition.

On the other hand, if x5678h is written to the LCA, since the lock code matches the security code B, not only the chip erase command but the initial analysis command may also be accepted in the test mode. It thus becomes possible in the test mode to perform fault analysis based, for example, on the sector-by-sector threshold voltage distribution without the need to perform the chip erase.

If 0xFFFFh, 0xAA55h, or a code other than x1234h or x5678h is written to the LCA, the security is unlocked in the test mode. That is, in the test mode, all of the write, read, and erase commands are accepted.

In this case, in the test mode, the program code written into the nonvolatile memory by the system manufacturer is freely accessible by the microcontroller manufacturer. That is, the system manufacturer returns the microcontroller to the microcontroller manufacturer by agreeing that the program code written into the nonvolatile memory is freely accessible by the microcontroller manufacturer.

In the above description, the nonvolatile memory is not limited to a flash memory, and other types of nonvolatile memory such as an EEPROM may be used. Further, the semiconductor device is also not limited to a microcontroller mounted with a nonvolatile memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A semiconductor device comprising:
a nonvolatile memory; and
an interface configured to transfer data to and from the nonvolatile memory, wherein
the interface includes a security logic unit which controls a security level for the data written to the nonvolatile memory, in accordance with a plurality of preset security codes and a lock code that is written to a specific area in the nonvolatile memory, and
the security codes include a first security code and a second security code, and wherein
in a test mode for testing the semiconductor device, the security logic unit sets security ON if the first security code matches the lock code, and sets security OFF if the first security code does not match the lock code, and in a normal mode for operating the semiconductor device, the security logic unit sets security OFF if the second security code matches the lock code, and sets security ON if the second security code does not match the lock code.

2. The semiconductor device as claimed in claim 1, wherein the security codes further include a third security code, and wherein in the test mode, if the first security code does not match the lock code, then the security logic unit sets security ON except for some functions if the third security code matches the lock code, and sets security OFF if the third security code does not match the lock code.

3. The semiconductor device as claimed in claim 2, wherein if the first security code does not match the lock code, but the third security code matches the lock code, the security logic unit permits only a predetermined function to be executed.

4. The semiconductor device as claimed in claim 3, wherein the predetermined function is a function that is executed by an initial analysis command for fault analysis of the semiconductor device.

5. The semiconductor device as claimed in claim 2, wherein the second security code includes a code corresponding to data resulting from a total erasure of the nonvolatile memory.

6. The semiconductor device as claimed in claim 5, wherein the first security code and the third security code are each chosen to be a code that differs from the code corresponding to the data resulting from a total erasure of the nonvolatile memory.

7. The semiconductor device as claimed in claim 2, wherein the second security code includes a code corresponding to a test pattern used in a pre-shipment test of the nonvolatile memory.

8. The semiconductor device as claimed in claim 7, wherein the first security code and the third security code are each chosen to be a code that differs from the code corresponding to the test pattern used in the pre-shipment test of the nonvolatile memory.

9. A semiconductor device comprising:
a nonvolatile memory; and
an interface configured to transfer data to and from the nonvolatile memory, wherein
the interface includes a security logic unit which controls a security level for the data written to the nonvolatile memory, in accordance with a plurality of preset security codes and a lock code that is written to a specific area in the nonvolatile memory, and
switching from the normal mode to the test mode is effected by entering a predetermined code from an external device.

10. The semiconductor device as claimed in claim 1, wherein the specific area is an area to be erased last in an address space of the nonvolatile memory.

11. The semiconductor device as claimed in claim 10, wherein the nonvolatile memory comprises a plurality of banks, and
the specific area is contained in a bank to be erased last among the plurality of banks.

12. The semiconductor device as claimed in claim 1, wherein the security codes are each preset in the interface by burn-in using a mask at the time of manufacture or by power supply clamping.

13. The semiconductor device as claimed in claim 1, wherein security state after startup is ON by default.

14. The semiconductor device as claimed in claim 1, further comprising a CPU, and wherein
the data written to the nonvolatile memory is a program code for implementing a prescribed function by controlling the CPU.

15. The semiconductor device as claimed in claim 9, wherein the specific area is an area to be erased last in an address space of the nonvolatile memory.

16. The semiconductor device as claimed in claim 15, wherein the nonvolatile memory comprises a plurality of banks, and
the specific area is contained in a bank to be erased last among the plurality of banks.

17. The semiconductor device as claimed in claim 9, wherein the security codes are each preset in the interface by burn-in using a mask at the time of manufacture or by power supply clamping.

18. The semiconductor device as claimed in claim 9, wherein security state after startup is ON by default.

19. The semiconductor device as claimed in claim 9, further comprising a CPU, and wherein
the data written to the nonvolatile memory is a program code for implementing a prescribed function by controlling the CPU.

* * * * *